(12) United States Patent
Durand et al.

(10) Patent No.: US 12,512,195 B2
(45) Date of Patent: Dec. 30, 2025

(54) SYSTEM FOR MONITORING HEALTH DATA ACQUISITION DEVICES

(71) Applicant: IMPLICITY, Paris (FR)

(72) Inventors: Julien Durand, Paris (FR); Julien Sarazin, Paris (FR); Maxime Guedj, Paris (FR)

(73) Assignee: IMPLICITY, Paris (FR)

( * ) Notice: Subject to any disclaimer, the term of this patent is extended or adjusted under 35 U.S.C. 154(b) by 230 days.

(21) Appl. No.: 17/729,257

(22) Filed: Apr. 26, 2022

(65) Prior Publication Data

US 2023/0343424 A1   Oct. 26, 2023

(51) Int. Cl.
| | |
|---|---|
| *G16H 10/65* | (2018.01) |
| *G06F 21/62* | (2013.01) |
| *G16H 80/00* | (2018.01) |
| *H04L 51/224* | (2022.01) |

(52) U.S. Cl.
CPC ......... *G16H 10/65* (2018.01); *G06F 21/6245* (2013.01); *G16H 80/00* (2018.01); *H04L 51/224* (2022.05)

(58) Field of Classification Search
CPC ...... G16H 10/65; G16H 80/00; H04L 51/224; G06F 21/6245; G06F 21/62
See application file for complete search history.

(56) References Cited

U.S. PATENT DOCUMENTS

| | | | |
|---|---|---|---|
| 10,665,341 B2 * | 5/2020 | Reid | G16H 10/65 |
| 11,183,043 B1 | 11/2021 | Stapleford et al. | |
| 2004/0030531 A1 * | 2/2004 | Miller | G16H 40/67 702/182 |
| 2005/0143671 A1 * | 6/2005 | Hastings | G16H 40/67 600/513 |
| 2007/0257788 A1 * | 11/2007 | Carlson | A61B 5/0002 600/300 |
| 2008/0139907 A1 * | 6/2008 | Rao | A61B 5/1171 600/323 |

(Continued)

FOREIGN PATENT DOCUMENTS

| | | | | |
|---|---|---|---|---|
| CA | 2797545 A1 * | 11/2010 | ........... | A61B 5/0002 |
| CN | 104364817 A * | 2/2015 | ......... | G06F 19/3418 |

(Continued)

OTHER PUBLICATIONS

Search Report issued on Jul. 3, 2023, in corresponding International Application No. PCT/EP2023/060661, 3 pages.

*Primary Examiner* — Kenneth Bartley
(74) *Attorney, Agent, or Firm* — Maier & Maier, PLLC

(57) ABSTRACT

A system for monitoring a health data acquisition device, and including a device database and a processing unit. The device database storing, for each health data acquisition device: a connection status of the health data acquisition device, having a first value indicative that health data from the health data acquisition device have been retrieved, or a second value indicative that health data from the health data acquisition device have not been retrieved; and patient contact information. The processing unit being configured to: monitor the connection status of each health data acquisition device; and send a notification to at least one patient contact associated with the respective patient, using the patient contact information, if a change of the connection status from the first value to the second value is detected.

16 Claims, 2 Drawing Sheets

(56) References Cited

U.S. PATENT DOCUMENTS

| | | | | |
|---|---|---|---|---|
| 2009/0089147 A1* | 4/2009 | Schoenberg | G06Q 10/06 | |
| | | | 705/2 | |
| 2013/0253952 A1* | 9/2013 | Burke | G16H 40/20 | |
| | | | 705/3 | |
| 2013/0317852 A1* | 11/2013 | Worrell | G16H 40/63 | |
| | | | 705/2 | |
| 2013/0325508 A1* | 12/2013 | Johnson | G16H 10/60 | |
| | | | 705/3 | |
| 2014/0046690 A1* | 2/2014 | Gunderson | G16H 40/63 | |
| | | | 705/3 | |
| 2014/0379813 A1* | 12/2014 | Charania | H04L 51/02 | |
| | | | 709/206 | |
| 2017/0199797 A1* | 7/2017 | Hresko | G16H 40/67 | |
| 2017/0296056 A1* | 10/2017 | Hresko | A61B 5/0015 | |
| 2018/0350455 A1* | 12/2018 | Rosen | G16H 80/00 | |
| 2019/0104382 A1* | 4/2019 | Lalka | G06Q 30/0267 | |
| 2019/0361871 A1* | 11/2019 | Brunets | H04M 15/60 | |
| 2020/0337651 A1* | 10/2020 | Kwan | G16H 20/13 | |
| 2021/0304902 A1* | 9/2021 | Rosen | G16H 80/00 | |
| 2022/0078139 A1* | 3/2022 | Sreenivasan | G16H 80/00 | |
| 2025/0031964 A1* | 1/2025 | Birolini | A61B 5/746 | |

FOREIGN PATENT DOCUMENTS

| | | | | |
|---|---|---|---|---|
| EP | 3462457 A1 * | 4/2019 | | G06Q 50/22 |
| EP | 3846418 A1 * | 7/2021 | | G06F 1/3231 |
| WO | WO-2013023067 A2 * | 2/2013 | | G08B 21/0492 |

* cited by examiner

SYSTEM FOR MONITORING HEALTH DATA ACQUISITION DEVICES

FIELD

The invention concerns a monitoring system for monitoring at least one health data acquisition device, each health data acquisition device being associated with a respective patient.

The invention also relates to a method for monitoring health data acquisition devices and a corresponding computer-readable storage medium.

The invention relates to the field of patient health monitoring.

BACKGROUND

It is known to perform remote monitoring of patients. For instance, such remote monitoring aims to make sure that a health data acquisition device of a patient is connected, that is to say able to regularly transmit acquired health data of the patient. Consequently, if a given health data acquisition device is detected as being disconnected, a healthcare provider contacts the corresponding patient, and tracks the follow-up actions with the patient until the health data acquisition device assumes a "connected" status again.

In the present case, by "disconnected health data acquisition device", it is meant a health data acquisition device that is not connected, which corresponds to the situation where, for one or more reasons, health data of a patient provided with said health data acquisition device are not retrieved (or, at least, not retrieved on a regular basis). Consequently, action may be required to overcome this situation.

However, known monitoring techniques are not satisfactory.

Indeed, such techniques heavily rely on the healthcare provider, who has to check, for each health data acquisition device manufacturer, a corresponding database to identify health data acquisition devices that are disconnected, then contact each corresponding patient to assess the situation.

This leaves an unacceptable burden on the healthcare provider, who should only focus on the health data acquisition devices that are disconnected due to an abnormal situation.

Consequently, a purpose of the invention is to provide a monitoring system for monitoring health data acquisition devices, which is not time-consuming for the healthcare provider.

SUMMARY

To this end, the present invention is a monitoring system of the aforementioned type, the monitoring system including at least one device database and a processing unit, each device database being configured to store, for each health data acquisition device:
- a connection status of the health data acquisition device, the connection status having a first value indicative that health data from the health data acquisition device have been retrieved within a predetermined time interval prior to a current data retrieval date, or a second value indicative that health data from the health data acquisition device have not been retrieved within the predetermined time interval prior to the current data retrieval date; and
- patient contact information of the respective patient;

the processing unit being configured, for each health data acquisition device:
- to monitor the connection status of the health data acquisition device; and
- send a notification to at least one patient contact associated with the respective patient, using the corresponding patient contact information, if a change of the corresponding connection status from the first value to the second value is detected.

Indeed, thanks to the invention, the processing unit monitors the connection status of each health data acquisition device, and automatically sends a notification to the corresponding patient, thereby preventing the healthcare provider from manually verifying the connection status of each health data acquisition device. Moreover, the device database may be a collection of information retrieved from a manufacturer database of the manufacturer of each health data acquisition device, thereby providing a unique interface for a potential further follow-up by the healthcare provider.

According to other advantageous aspects of the invention, the monitoring system includes one or more of the following features, taken alone or in any possible combination:
- for each health data acquisition device, the processing unit is further configured to send at least one additional notification to the at least one patient contact of the respective patient, using the corresponding patient contact information, while the connection status has the second value;
- for each health data acquisition device, the patient contact information of the respective patient includes a plurality of patient contacts, each having a corresponding rank, and wherein, for a given patient, the processing unit is configured to send the $i^{th}$ notification to each patient contact having a rank i;
- for each health data acquisition device, the patient contact information of the respective patient further includes, for each patient contact, an indication of a respective communication system for sending the notification to the patient contact;
- each health data acquisition device includes at least one of a connected implant, a cardiac implantable electronic device, a wearable device, or an electronic device configured to run a dedicated health data acquisition app, or to provide access to a web interface for inputting health data;
- the notification includes a short message service (SMS) message, an email and/or a voice message;
- the health data acquisition device includes a sensor configured to acquire the health data and a transceiver configured to output the health data acquired by the sensor, the notification including an indication as to whether the health data from the health data acquisition device have not been retrieved due to the corresponding sensor or to the corresponding transceiver;
- the notification includes a hyperlink to a patient interface comprising at least one of:
  - customer support contact information regarding the health data acquisition device of the patient;
  - technical information regarding the health data acquisition device of the patient;
  - a first interactive interface element for reporting an occurrence of a predetermined normal situation where health data from the health data acquisition device cannot be retrieved;
  - a field for inputting a deactivation date until which a notification should not be sent; and a second interactive interface element for reporting the end of a situation where health data from the health data acquisition device cannot be retrieved;

the patient interface is a secure interface requiring authentication for access thereto;

the authentication includes inputting a date of birth of the patient;

the patient interface is a web interface or an app interface;

for each health data acquisition device associated with a connection status having the second value, the processing unit is configured to change the connection status from the second value to the first value when retrieval of health data from the health data acquisition device is detected;

for each health data acquisition device, the processing unit is configured to determine the corresponding connection status based on an availability of health data from the health data acquisition device at a manufacturer database of a manufacturer of the health data acquisition device;

the processing unit is configured to, for each health data acquisition device associated with a connection status having the second value, activate a disconnection alert on a healthcare provider interface;

the health data acquisition device includes a sensor configured to acquire the health data and a transceiver configured to output the health data acquired by the sensor, the disconnection alert including an indication as to whether the health data from the health data acquisition device have not been retrieved due to the corresponding sensor or to the corresponding transceiver;

for each health data acquisition device, the processing unit is configured to activate the disconnection alert when the connection status still has the second value after a predetermined alert duration has elapsed from a notification date at which the notification is sent;

for at least one health data acquisition device, the processing unit is configured to deactivate the disconnection alert if the current date is prior to the corresponding deactivation date;

the healthcare provider interface is a web interface or an app interface;

the processing unit is configured to output, on a healthcare provider interface, a disconnected patient list including an identifier of at least part of the health data acquisition devices associated with a connection status having the second value.

The invention also relates to a method for monitoring at least one health data acquisition device, each health data acquisition device being associated with a respective patient, each health data acquisition device being further associated with:

a connection status of the health data acquisition device, the connection status having a first value indicative that health data from the health data acquisition device have been retrieved within a predetermined time interval prior to a current data retrieval date, or a second value indicative that health data from the health data acquisition device have not been retrieved within the predetermined time interval prior to the current data retrieval date; and patient contact information of the respective patient;

the method comprising, for each health data acquisition device:

monitoring the connection status of the health data acquisition device; and sending a notification to at least one patient contact associated with the respective patient, using the corresponding patient contact information, if a change of the corresponding connection status from the first value to the second value is detected.

The invention also relates to a non-transitory computer-readable storage medium comprising instructions which, when the program is executed by a computer, causes the computer to carry out the steps of the method as defined above.

BRIEF DESCRIPTION OF THE DRAWINGS

The invention will be better understood with the attached figures, in which.

DETAILED DESCRIPTION

Figure 1:
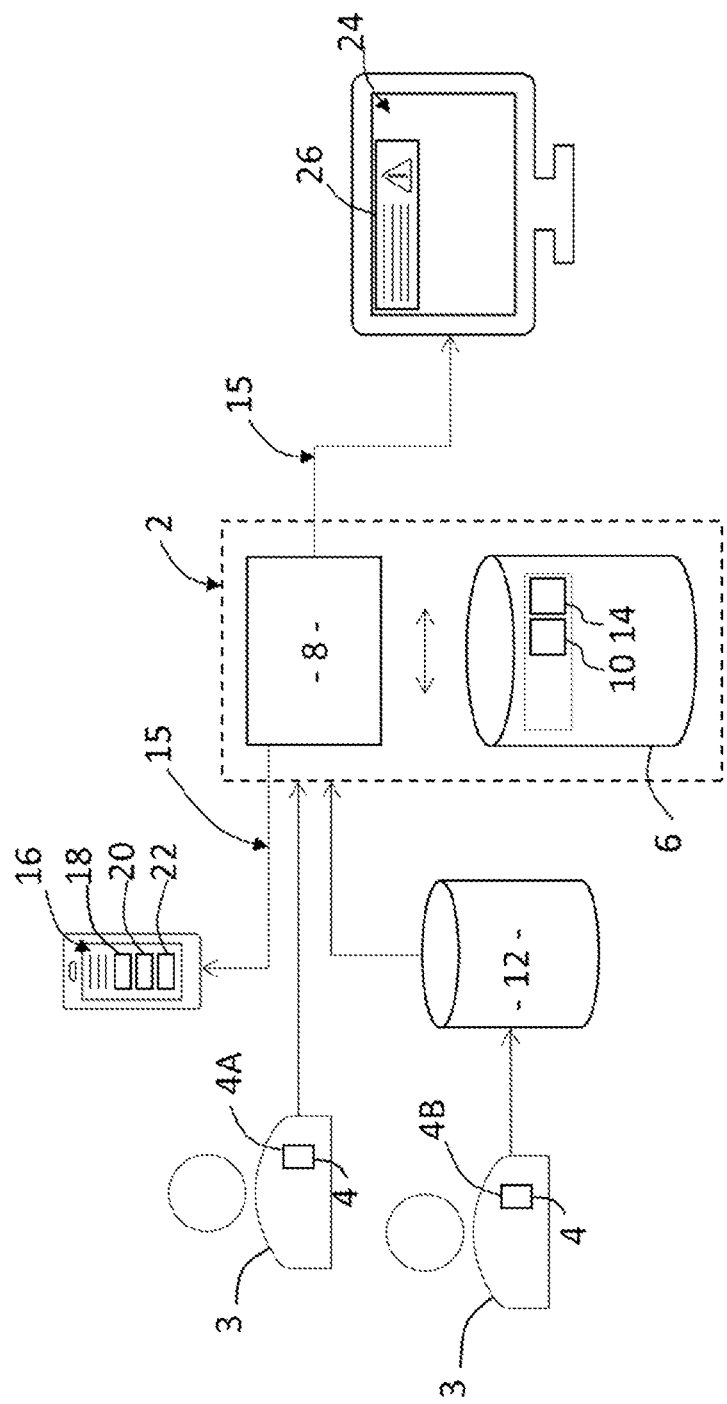
FIG. 1 is a schematic representation of the monitoring system according to the invention.

A monitoring system 2 according to the invention is shown on FIG. 1.

The monitoring system 2 is designed for monitoring at least one health data acquisition device 4.

More precisely, each health data acquisition device 4 is associated with a patient 3, and is configured to acquire health data relating to said respective patient 3.

For instance, the health data acquisition device 4 includes a connected implant, a cardiac implantable electronic device (CIED) or a wearable device. The health data acquisition device 4 may also be an electronic device running a dedicated app, or configured for manually inputting health data relating to the patient (for instance by filling in a dedicated form). The health data acquisition device 4 may also be configured to display a web interface allowing the patient or a relative to input corresponding health data.

The monitoring system 2 includes at least one device database 6 and the aforementioned processing unit 8.

Device Database 6

Each device database 6 is configured to store, for each health data acquisition device 4, a connection status 10 of said health data acquisition device 4.

The connection status 10 has a first value or a second value. More precisely, the first value is indicative that health data from the health data acquisition device 4 have been retrieved within a predetermined time interval prior to a current data retrieval date. Moreover, the second value is indicative that health data from the health data acquisition device 4 have not been retrieved within the predetermined time interval prior to the current data retrieval date.

For instance, for a given health data acquisition device 4A, the associated current retrieval date corresponds, at a given time, to the last date at which the processing unit 8 has attempted to collect health data from said health data acquisition device 4A.

Alternatively, or in addition, for a given health data acquisition device 4B, the associated current retrieval date corresponds, at a given time, to the last date at which a manufacturer database 12 (mentioned above) of a manufacturer of the health data acquisition device 4B has attempted to collect health data from said health data acquisition device 4B. In this case, for each health data acquisition device 4B, the processing unit 8 is configured to determine the corresponding connection status based on the availability, in the manufacturer database 12, after the current retrieval date of the manufacturer database 12, of the health data from the health data acquisition device 4B. More precisely, in this case, for a given health data acquisition device 4B, the processing unit 8 is configured to search the manufacturer database 12 using a unique identifier of the health acquisition device 4B in order to determine the availability of the corresponding health data in the manufacturer database 12.

Furthermore, for each health data acquisition device 4, the device database 6 is also configured to store patient contact information 14 of the respective patient 3.

Preferably, for each health data acquisition device 4, the patient contact information 14 of the respective patient includes a plurality of patient contacts, each having a corresponding rank.

Preferably, for each health data acquisition device 4, the patient contact information of the respective patient further includes, for each patient contact, an indication of a respective communication system for sending a notification 15 (described below) to the patient contact. For instance, such indication may be: short message service (SMS) message to send the notification 15 to the patient himself, email to send the notification 15 to the patient's nurse, phone call to send the notification 15 to the patient's doctor, and so on.

Processing Unit 8

According to the present invention, the expression "processing unit" should not be construed to be restricted to hardware capable of executing software, and refers in a general way to a processing device, which can for example include a microprocessor, an integrated circuit, or a programmable logic device (PLD). The processing unit may also encompass one or more Graphics Processing Units (GPU) or Tensor Processing Units (TSU), whether exploited for computer graphics and image processing or other functions. Additionally, the instructions and/or data enabling to perform associated and/or resulting functionalities may be stored on any processor-readable medium such as, e.g., an integrated circuit, a hard disk, a CD (Compact Disc), an optical disc such as a DVD (Digital Versatile Disc), a RAM (Random-Access Memory) or a ROM (Read-Only Memory). Instructions may be notably stored in hardware, software, firmware or in any combination thereof.

For each health data acquisition device 4, the processing unit 8 is configured to monitor the corresponding connection status 10 stored in the device database 6.

Furthermore, for each health data acquisition device 4, the processing unit 8 is configured to send the aforementioned notification 15 to at least one patient contact associated with the respective patient 3, using the corresponding patient contact information, if a change of the corresponding connection status from the first value to the second value is detected.

Preferably, for each health data acquisition device 4, and while the respective connection status 10 has the second value, the processing unit 8 is configured to send at least one additional notification 15 to the at least one patient contact of the respective patient 3, using the corresponding patient contact information 14.

Moreover, in the case where the patient contact information 14 includes a plurality of patient contacts each having a corresponding rank, the processing unit 8 is preferably configured to send, for a given patient 3, the i$^{th}$ notification 15 to each corresponding patient contact having rank i (i being an integer).

Preferably, for each health data acquisition device 4 associated with a connection status having the second value, the processing unit 8 is configured to change the connection status 10 from the second value to the first value when retrieval of health data from said health data acquisition device 4 is detected. This prevents sending unnecessary notifications.

As mentioned previously, the notification 15 may include a short message service (SMS) message, an email, a voice message, and so on. The notification 15 may also include a call from an interactive voice response (IVR) server.

For instance, in the case where the notification 15 includes an SMS message or an email (or, more generally, a written message), the notification 15 may include a hyperlink to a patient interface 16. Such patient interface 16 may be a web interface or an app interface, as shown on FIG. 1.

Preferably, to increase data privacy, the patient interface 16 is a secure interface requiring authentication for access thereto. For example, such authentication includes inputting a date of birth of the patient 3. This provides a restricted access to potentially sensitive data without having to remember a password.

The patient interface 16 may comprise customer support contact information regarding the health data acquisition device 4 of the patient 3. The patient interface 16 may also comprise technical information regarding the health data acquisition device 4 of the patient 3. Such technical information may, for example, be directed to troubleshooting, for instance instructions allowing the patient 3 to determine why health data cannot be retrieved from the health data acquisition device 4.

Alternatively, or in addition, the patient interface 16 comprises a first interactive interface element 18 for reporting an occurrence of a predetermined situation where health data from the health data acquisition device 4 cannot be retrieved. Such situation, which is deemed as a "normal situation", may correspond, for instance, to the patient being on holidays or at the hospital. In this case, the processing unit 8 may be configured to stop sending notifications.

In this case, the patient interface 16 advantageously further includes a field 22 for inputting a corresponding deactivation date until which notifications 15 should not be sent by the monitoring system 2. This deactivation date may, for instance, correspond to the patient's last day of holidays or hospitalization. Consequently, the processing unit 8 may be further configured to write the inputted deactivation date in the patient database 6, and to stop sending notifications while the current date is prior to the deactivation date.

Preferably, the patient interface 16 also comprises a second interactive interface element 20 for reporting the end of a situation where health data from the health data acquisition device 4 cannot be retrieved. In this case, the processing unit 8 may be configured to restart sending notifications 15, if the connection status of the health data acquisition device 4 has the second value, i.e., if retrieval of health data from said health data acquisition device 4 cannot be achieved.

Moreover, the processing unit 8 is preferably configured to, for each health data acquisition device 4 associated with a connection status having the second value, activate a disconnection alert 26 on a healthcare provider interface 24. The healthcare provider interface 24 may be a web interface or an app interface.

Such disconnection alert 26 may be a one-time alert, such as a message, or a permanent alert, such as a predetermined icon appearing next to the name of the patient having the health data acquisition device 4 from which health data could not be retrieved.

Preferably, the processing unit 8 is configured to activate said disconnection alert 26 when the connection status of a given health data acquisition device 4 still has the second value after a predetermined alert duration has elapsed from a notification date at which the first notification 15 is sent.

Preferably, the processing unit 8 is configured to deactivate the disconnection alert if the current date is prior to the aforementioned deactivation date.

Additionally, the processing unit 8 may be configured to output, on the healthcare provider interface 24, a disconnected patient list including an identifier of at least part of the health data acquisition devices associated with a connection status having the second value. Said identifier may be the name of the corresponding patient 3.

Operation

Figure 2:
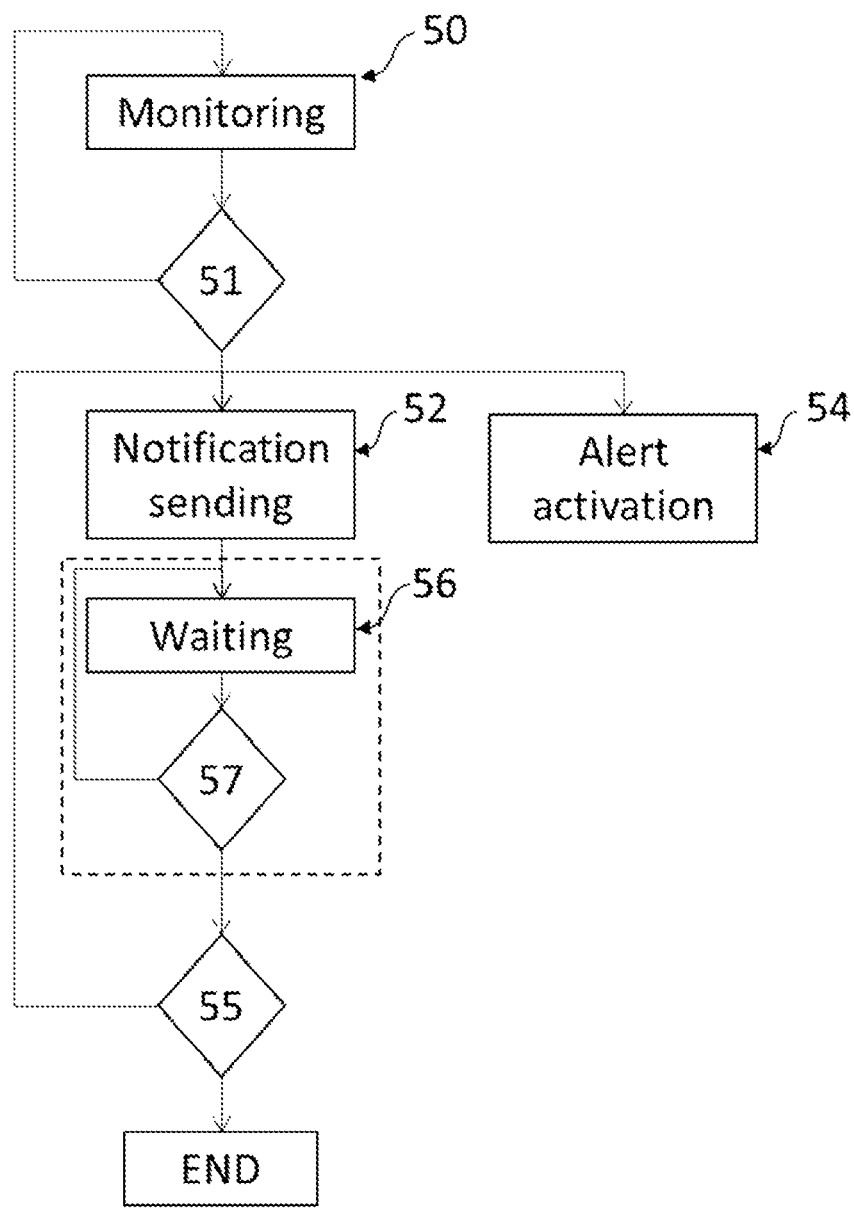
FIG. 2 is a flowchart of a monitoring method according to the invention.

Operation of the monitoring system 2 will now be described with reference to FIG. 2.

During a monitoring step 50, the processing unit 8 monitors the connection status 10 stored, for each health data acquisition device 4, in the device database 6.

For each health data acquisition device 4, if the processing unit 8 detects, during a step 51, a change of the corresponding connection status 10 from the first value to the second value, then, during a notification sending step 52, the processing unit 8 sends a notification 15 to at least one patient contact associated with the respective patient 3. More precisely, for a given health data acquisition device 4, the processing unit 8 uses the corresponding patient contact information to send the notification 15.

Preferably, for each health data acquisition device 4 associated with a connection status having the second value, the processing unit 8 further activates, during an alert activation step 54, a disconnection alert 26 on a healthcare provider interface 24. In this case, the processing unit 8 preferably activates said disconnection alert 26 when the connection status of a given health data acquisition device 4 still has the second value after a predetermined alert duration has elapsed from a notification date at which the first notification 15 is sent.

Additionally, the processing unit 8 may output, on the healthcare provider interface 24, a disconnected patient list including an identifier of at least part of the health data acquisition devices associated with a connection status having the second value.

Preferably, while the connection status 10 has the second value, e.g., if the processing unit 8 detects, at step 55, that the connection status 10 still has the second value (for instance, after a predetermined duration has elapsed following the previous notification sending step 52), the processing unit 8 performs at least one additional sending step 52, in order to send at least one additional notification 15. Preferably, two successive iterations of the sending step 52 are spaced in time by the aforementioned predetermined time period.

For instance, in the case where the patient contact information 14 includes a plurality of patient contacts each having a corresponding rank, the processing unit 8 sends, during the i$^{th}$ iteration of the sending step 52, the corresponding i$^{th}$ notification 15 to each patient contact having rank i.

Preferably, if the processing unit 8 detects that, in response to a notification 15, the patient or a relative has inputted, through the patient interface 16, a deactivation date until which notifications 15 should not be sent by the monitoring system 2, then, during a waiting step 56, the processing unit 8 stops sending notifications if, at step 57, the current date is earlier than the deactivation date.

In this case, the processing unit 8 preferably deactivates the disconnection alert if the current date is earlier than the deactivation date.

Preferably, at any time, and for each health data acquisition device 4 associated with a connection status having the second value, if the processing unit 8 detects that health data from said health data acquisition device 4 have been retrieved, then the processing unit 8 changes the connection status 10 from the second value to the first value.

Preferably, at any time after a notification 15, if the processing unit 8 detects that, the patient or a relative has reported, through the patient interface 16 accessed through the notification 15, an occurrence of a predetermined situation where health data from the health data acquisition device 4 cannot be retrieved, then the processing unit 8 stops sending notifications relating to the corresponding health data acquisition device 4.

Preferably, in this case, if the processing unit detects that the patient or a relative has reported, through the patient interface 16, the end of said situation where health data from the health data acquisition device 4 cannot be retrieved, then the processing unit 8 performs the monitoring step 50.

Alternatives

In some embodiments, and especially in the case where the health data acquisition device 4 comprises a connected implant, the health data acquisition device 4 includes a sensor configured to acquire the health data and a transceiver configured to receive the health data acquired by the sensor, and to send said received health data to a processing unit 8 of the monitoring system 2, or to a manufacturer database 12 of a manufacturer of said health data acquisition device 4.

In this case, the second value stored in the device database 6 is further indicative of whether health data from the health data acquisition device 4 have not been retrieved due to the corresponding sensor or to the corresponding transceiver. For instance, in the case where health data from the health data acquisition device 4 have not been retrieved, it is determined that this is due to the sensor if the transceiver is able to send an echo reply further to the reception of an echo request (typically using Internet Control Message Protocol, ICPM, through the ping utility).

Preferably, the notification 15 and/or the patient interface 16 accessed through the notification 15 includes an indication as to whether health data from the health data acquisition device 4 have not been retrieved due to the corresponding sensor or to the corresponding transceiver. Such indication may provide insight to the patient for a more efficient troubleshooting.

Preferably, the disconnection alert 26 includes an indication as to whether health data from the health data acquisition device 4 have not been retrieved due to the corresponding sensor or to the corresponding transceiver. Such indication may lead the healthcare provider to take appropriate action, especially if the health data have not been retrieved due to the sensor, thereby providing a hint regarding a potential misfunction of said sensor.

The invention claimed is:

1. A monitoring system for monitoring at least two health data acquisition devices, each health data acquisition device being associated with a respective patient, the monitoring system including at least one device database and a processing unit comprising a processor, each device database being configured to store, for each health data acquisition device:

health data from the respective patient derived from a sensor of the health data acquisition device, a plurality of physical measurements of the respective patient, and connection information for a transceiver, a connection status of the health data acquisition device, the connection status having a first value indicative that health data from the health data acquisition device have been retrieved within a predetermined time interval prior to a current data retrieval date, or a second value indicative that health data from the health data acquisition device have not been retrieved within the predetermined time interval prior to the current data retrieval date; and patient contact information of the respective patient;

the processing unit being configured, for each health data acquisition device to:

monitor the connection status of the health data acquisition device;

upon detection of a change in the connection status, for the respective patient, send, by the processing unit, a notification to at least one patient contact associated with the respective patient, using the patient contact information, the notification including an indication as to whether the health data from the health data acquisition device have not been retrieved due to the sensor or to the transceiver;

send at least one additional notification to the at least one patient contact of the respective patient, using the patient contact information while the respective connection status has the second value;

activate a disconnection alert on a healthcare provider interface, after the corresponding connection status remains at the second value for a predetermined duration of time that has elapsed after the notification or each of the at least one additional notification, the disconnection alert including an indication as to whether the health data from the health data acquisition device have not been retrieved due to the sensor or to the transceiver; and either continue monitoring the connection status of the health data acquisition device and to change the connection status from the second value to the first value when health data from the health acquisition device is retrieved thereby preventing sending the at least one additional notification; or continue monitoring the connection status of the health data acquisition device and stop sending notification to the at least one patient contact, upon detection by the processing unit of an occurrence reported by said at least one patient or patient relative of a predetermined situation where health data from the health data acquisition device cannot be retrieved, wherein each notification is at least one of short message service (SMS), an email, a voice message, or a call from an interactive voice response (IVR) server, and the disconnection alert is one of a one-time alert or a permanent alert.

2. The monitoring system of claim 1, wherein, for each health data acquisition device, the patient contact information of the respective patient includes a plurality of patient contacts, each having a corresponding rank, and wherein, for a given patient, the processing unit is configured to send an $i^{th}$ notification to each patient contact having a rank i.

3. The monitoring system of claim 1, wherein, for each health data acquisition device, the patient contact information of the respective patient further includes, for each patient contact, an indication of a respective communication system for sending the notification to the patient contact.

4. The monitoring system of claim 1, wherein each health data acquisition device includes at least one of a connected implant, a cardiac implantable electronic device, a wearable device, or an electronic device configured to run a dedicated health data acquisition app, or to provide access to a web interface for inputting health data.

5. The monitoring system of claim 1, wherein each notification is at least one of an SMS or an email and includes a hyperlink to a patient interface comprising at least one of:

customer support contact information regarding the health data acquisition device of the patient;

technical information regarding the health data acquisition device of the patient;

a first interactive interface element for reporting an occurrence of a predetermined normal situation where health data from the health data acquisition device cannot be retrieved;

a field for inputting a deactivation date until which a notification should not be sent; and a second interactive interface element for reporting an end of a situation where health data from the health data acquisition device cannot be retrieved.

6. The monitoring system of claim 1, wherein the patient interface is a secure interface requiring authentication for access thereto.

7. The monitoring system of claim 6, wherein the authentication includes inputting a date of birth of the patient.

8. The monitoring system of claim 1, wherein the patient interface is a web interface or an app interface.

9. The monitoring system of claim 1, wherein, for each health data acquisition device, the processing unit is configured to determine the corresponding connection status based on an availability of health data from the health data acquisition device at a manufacturer database of a manufacturer of the health data acquisition device.

10. The monitoring system of claim 1, wherein, the processing unit is configured to activate the disconnection alert if the connection status remains at the second value after a predetermined alert duration has elapsed from a notification date at which the notification is sent.

11. The monitoring system of claim 10, wherein, the processing unit is configured to deactivate the disconnection alert if the current date is prior to the corresponding deactivation date.

12. The monitoring system of claim 1, wherein the healthcare provider interface is a web interface or an app interface.

13. The monitoring system of claim 1, wherein the processing unit is configured to output, on a healthcare provider interface, a disconnected patient list including an identifier of at least part of the health data acquisition devices associated with a connection status having the second value.

14. A method for monitoring at least two health data acquisition devices, each health data acquisition device being associated with a respective patient, each health data acquisition device being further associated with:

a sensor configured to acquire health data from the respective patient and a transceiver configured to output the health data acquired by the sensor, the health date being further derived from a plurality of physical measurements of the respective patient and connection information for the transceiver, and a connection status of the health data acquisition device, the connection status having a first value indicative that health data from the health data acquisition device have been retrieved within a predetermined time interval prior to a current data retrieval date, or a second value indicative that health data from the health data acquisition device have not been retrieved within the predetermined time interval prior to the current data retrieval date; and patient contact information of the respective patient; the method comprising, for each health data acquisition device:

monitoring the connection status of the health data acquisition device;

upon detection of a change in the connection status, for the respective patient, sending a notification to at least one patient contact associated with the respective patient, using the patient contact information, the notification including an indication as to whether the health data from the health data acquisition device have not been retrieved due to the sensor or to the transceiver;

sending at least one additional notification to the at least one patient contact of the respective patient, using the patient contact information while the respective connection status has the second value;

activating a disconnection alert on a healthcare provider interface, after the corresponding connection status remains at the second value for a predetermined duration of time that has elapsed after the notification or each of the at least one additional notification, the disconnection alert including an indication as to whether the health data from the health data acquisition device have not been retrieved due to the sensor or to the transceiver; and either continuing monitoring the connection status of the health data acquisition device and changing the connection status from the second value to the first value when health data from the health acquisition device is retrieved thereby preventing sending the at least one additional notification; and continuing to monitor the connection status of the health data acquisition device and stop sending the notification to said at least one patient contact, upon detection by a processor of the processing unit of: an occurrence reported by said at least one patient or patient relative of a predetermined situation where health data from the health data acquisition device cannot be retrieved, wherein each notification sent to said at least one message contact is at least one of a short message service (SMS), an email, a voice message, or a call from an interactive voice response (IVR) server, and the disconnection alert is one of a one-time alert or a permanent alert.

15. A non-transitory computer-readable storage medium comprising instructions which, when the program is executed by a computer, causes the computer to carry out the steps of the method according to claim 14.

16. A monitoring system for monitoring at least two health data acquisition devices, each health data acquisition device being associated with a respective patient, the monitoring system including at least one device database and a processing unit comprising a processor, each device database being configured to store, for each health data acquisition device:

health data from the respective patient derived from a sensor of the health data acquisition device, a plurality of physical measurements of the respective patient, and connection information for a transceiver, a connection status of the health data acquisition device, the connection status having a first value indicative that health data from the health data acquisition device have been retrieved within a predetermined time interval prior to a current data retrieval date, or a second value indicative that health data from the health data acquisition device have not been retrieved within the predetermined time interval prior to the current data retrieval date; and patient contact information of the respective patient;

the processing unit being configured, for each health data acquisition device to:

monitor the connection status of the health data acquisition device;

upon detection, of a change in the connection status, for the respective patient, send, by the processing unit, of a notification to at least one patient contact associated with the respective patient, using the patient contact information, the notification including an indication as to whether the health data from the health data acquisition device have not been retrieved due to the sensor or to the transceiver;

send at least one additional notification to the at least one patient contact of the respective patient, using the patient contact information while the respective connection status has the second value;

activate a disconnection alert on a healthcare provider interface, after the corresponding connection status remains at the second value for a predetermined duration of time that has elapsed after the notification or each of the at least one additional notification, the method sending the at least one additional notification after a predetermined duration has elapsed following the sending of a previous notification, the disconnection alert including an indication as to whether the health data from the health data acquisition device have not been retrieved due to the sensor or to the transceiver; and either continue monitoring the connection status of the health data acquisition device and to change the connection status from the second value to the first value when health data from the health acquisition device is retrieved thereby preventing sending the at least one additional notification; or continue monitoring the connection status of the health data acquisition device and stop sending the notification to said at least one patient contact, if upon detection by the processing unit of:

an occurrence reported by said at least one patient or patient relative of a predetermined situation where health data from the health data acquisition device cannot be retrieved, wherein each notification is at least one of short message service (SMS), or an email, and includes a hyperlink to a patient interface comprising at least one of:

a first interactive interface element for reporting an occurrence of a predetermined situation where health data from the health data acquisition device cannot be retrieved, the patient interface further including a field for inputting a deactivation date until which a notification should not be sent; and a second interactive interface element for reporting the end of a situation where health data from the health data acquisition device cannot be retrieved, and wherein the disconnection alert is one of a one-time alert or a permanent alert.

\* \* \* \* \*